Jan. 20, 1959 G. O. KIMMELL 2,869,569
AUTOMATIC DUMP VALVE SYSTEMS
Filed Nov. 23, 1953
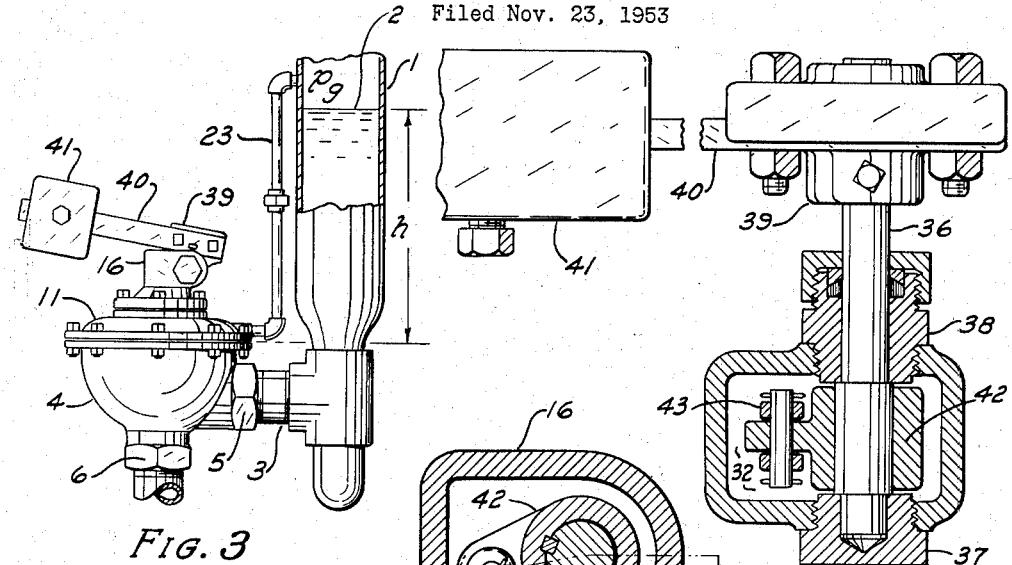
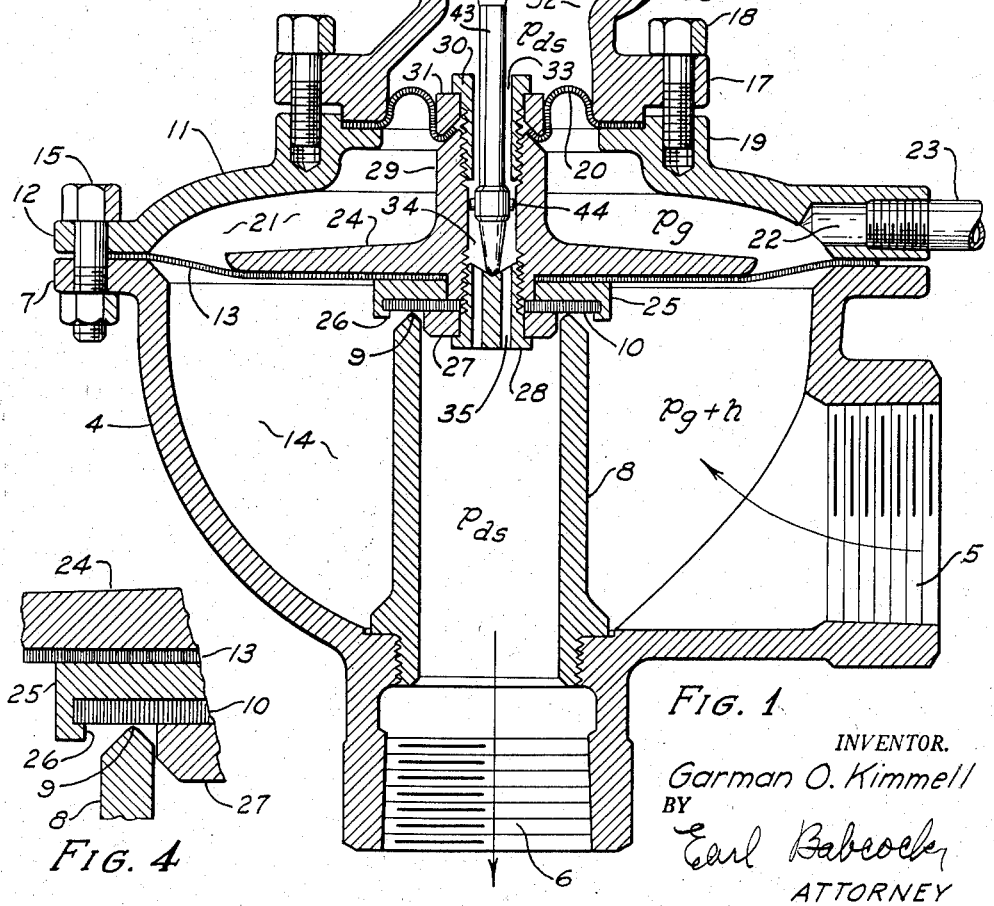
INVENTOR.
Garman O. Kimmell
BY
Earl Babcock
ATTORNEY

United States Patent Office 2,869,569
Patented Jan. 20, 1959

2,869,569

AUTOMATIC DUMP VALVE SYSTEMS

Garman O. Kimmell, Oklahoma City, Okla.

Application November 23, 1953, Serial No. 393,731

2 Claims. (Cl. 137—188)

This invention relates to automatic systems to control liquid level in a vessel and more particularly to dump valve systems for regulating or controlling liquid level in vessels under gas pressure from which it is desired to remove accumulating liquid in response to reasonably small changes in liquid head.

It is desirable in many industrial applications to maintain liquid at a desired level in a tank or vessel or in the overflow outlet piping from the tank or vessel within reasonable limits. For example, in vessels used to separate oil from water, it is desired to maintain a predetermined level in the oil outlet piping and water outlet piping even though the rate of inflow of the liquids is variable. It is common to operate such tanks or vessels under gas pressure above that of the atmosphere and with varying pressures. Not only does the pressure in the vessel vary but the pressure also varies in the flow line downstream therefrom.

It has heretofore been proposed to regulate the dumping of such vessels to maintain the liquid at approximately the desired level, but such systems have not been entirely satisfactory because they either fail to eliminate the effects on the liquid level of variations in gas pressure in the vessel or fail to eliminate the effects of pressure changes in the flow lines downstream from the dumping system.

One object of the invention is to provide a dump valve for the removal of liquid from a vessel or pipe without the necessity of using floats or float chambers, but in which only an equalizing gas line to the space above the liquid level to be controlled is required.

Another object of the invention is to provide a dump valve which is sensitive only to the head of liquid being controlled, the effects of changing upstream and downstream pressures being cancelled or essentially cancelled out.

A further object of the invention is to provide a dump valve which has snap action, i. e. it tends to be either open or closed at low rates of flow to eliminate or reduce the tendencies to wire draw or cut out the main valve element.

A further object of the invention is to produce a simple and trouble-free dump valve to operate over a wider range of liquid level positions than in float driven mechanisms where the limits of the range of operation are defined by the extreme positions of and vertical displacement of the float.

A still further object of the invention is to provide a dump valve which is free of close fitting parts and thus not subject to the usual effects of depositions from the flow stream which often interfere with the proper operation of present dump valves.

An important object of the invention is to provide a dump valve which is capable of closing off completely under the influence of a very small drop in liquid level, thus eliminating the possibility of static liquid in the vessel or pipe leaking off. The valve cannot pass the gas with which it is equalized.

With the preceding and other objects in mind, the invention resides in the combination and arrangement of parts and in the details of construction described and claimed.

In the drawings, wherein like numerals of reference designate corresponding parts:

Figure 1 is a vertical cross-sectional view of a dump valve designed to carry out the invention;

Figure 2 is a horizontal cross section of the crank housing, bell crank, and stuffing box of the dump valve of Figure 1, the view being taken along the line 2—2 of Figure 1;

Figure 3 is a reduced view of the dump valve of Figures 1 and 2 and showing it in a typical installation; and Figure 4 is an enlarged section of a portion of the seat and valve element of the dump valve of Figure 1.

Referring in detail to the drawings and first to the assembly shown in Figure 3, 1 designates a vessel or pipe in which it is desired to control the liquid level shown at 2. It will be understood that means not shown supplies liquid to the vessel, either continuously, or intermittently or variably, and that it is desired to maintain a head of liquid approximately as illustrated at $h$ by the action of the dump valve structure. Attachment of the dump valve structure to vessel 1 is accomplished by a nipple 3. The dump valve structure includes a bowl or housing 4 provided with an inlet conduit 5 and a discharge or downstream outlet 6.

As shown in Figure 1, the upper end of housing 4 is provided with a flange 7. Within the housing 4, there is a cylindrical discharge conduit 8, which can be either removable (as illustrated) or a part thereof, and which has a valve seat 9 at its upper end. The valve seat 9 in cooperation with a resilient valve disc 10 serves to open or close the communication between inlet conduit 5 and discharge conduit 8 and thus regulate the flow from the vessel 1 through the dump valve structure. A bonnet 11 is provided with a flange 12 designed to cooperate with the flange 7 of housing 4. A diaphragm 13, clamped between flanges 7 and 12, forms a chamber 14 in the housing 4.

Inlet 5 of the dump valve communicates directly with the chamber 14. The outer margin of the diaphragm 13 is held in clamped engagement between flanges 7 and 12 by circumferentially spaced bolts 15. A crank housing 16 provided with a flange 17, is held in bolted engagement with the upper end of the bonnet 11 by the bolts 18. Incorporated in the upper end of the bonnet 11 is a boss or flange 19 tapped to adapt bolts 18. The outer margin of a balancing diaphragm 20 is clamped between flange 17 of crank housing 16 and the boss or flange 19 of bonnet 11. Thus between diaphragm 13 and balancing diaphragm 20, within bonnet 11 is formed a gas equalizing chamber 21. This gas equalizing chamber 21 is isolated from the rest of the assembly except for a single outlet 22. As shown in Figure 3, an equalizer tube 23 may be connected to the outlet 22 and thus provide communication between chamber 21 and the gas space in pipe 1 at a point above its liquid level 2.

The pressure in chamber 14 is always greater than that in chamber 21. A diaphragm plate 24 supports diaphragm 13 against the greater pressure in chamber 14. The unsupported portion of diaphragm 13 is kept relatively small, so that the plate 24 acts substantially like a piston in the housing 4. A valve disc retainer 25 supports the outer margin of the resilient valve disc 10 by an overhanging lip 26 and clamps the inner margin of diaphragm 13. A depending piston 27 supports and clamps the inner portion of resilient valve disc 10. A pivot socket element 28 is threaded to plate 24 and holds the piston 27, resilient valve disc 10, valve disc retainer 25, and diaphragm 13 in clamped engagement with diaphragm plate 24.

There is special coaction between the piston 27 and the valve seat 9. As shown in detail in Figure 4, the valve seat 9 is beveled or chamfered both internally and externally, to form two tapered or conical surfaces which provide a rather sharp circular rim or apex to engage the resilient disc 10. The depending piston 27 projects some distance down into the conduit 8 below the inner chamfer of the valve seat 9 when the valve is closed, and it will be seen that the diameter of the piston 27 is only slightly less than that of the conduit 8 so as to provide a restricted passage for the flow of fluid past the piston 27 when the parts are in the position shown in the drawing. The area of the conduit 8 (hereinafter designated $A_8$) is thus less than the area of the rim of the valve seat (hereinafter designated $A_9$), and because of the restricted passage along the piston 27, there is a sharp though small increase in the area of the disc 10 subjected to the difference in pressure between the chamber 14 and the conduit 8 just after the valve starts its opening movement. The significance of this will become apparent from a consideration of the operation of the valve described hereinafter.

The diaphragm plate 24 is provided with an upwardly extending neck 29, the upper end of which engages the central portion of a balancing diaphragm 20. A tubular retaining element 30 clamps the balancing diaphragm 20 and a retaining ring 31 to the neck 29. In order for the dump valve to function to the best advantage the outside diameter of the retaining ring 31 and the diameter of housing 16 at the circle where it seals with diaphragm 20 are of such dimensions that the effective area of diaphragm 20 is essentially equal to the area of the circle of valve seat 9.

The term "effective area" as used herein requires some explanation. The diaphragm 20 is moulded to have the shape illustrated in Figure 1. The area of diaphragm 20 at the circle where it seals with housing 16 would constitute the "total" area of the diaphragm insofar as pressure is concerned. However, the total force exerted on the valve assembly because of a difference in pressure across the diaphragm 20 is not the unit pressure times the "total" area, because part of the force due to this difference in unit pressure is transmitted by the diaphragm to the housing 16. The portion of the "total" area which may be said to exert all of its pressure force upon the valve assembly is called the "effective area."

Within the crank housing 16 and above balancing diaphragm 20 there is formed a downstream equalizing chamber 32. This downstream equalizing chamber 32 is in communication at all times with the inside of conduit 8 and the outlet 6. A passageway for this purpose is provided by the central hole 33 in the retaining element 30, hole 34 through the extended neck 29 of the diaphragm plate 24, and through holes 35 in the socket element 28.

It will thus be seen that the dump valve structure comprises a housing having an overflow type discharge conduit 8 with a specially designed valve seat 9 at its upper end, a valve plug assembly having two diaphragms 13 and 20 to provide three chambers: A main flow chamber 14, a gas equalizing chamber 21 above the main flow chamber 14, and a downstream equalizing chamber 32, together with a passageway connecting the chamber 32 to the downstream or discharge conduit 8 at all times.

Disposed transversely across the crank housing 16 and to one side of the center line of the valve is a trunnion shaft 36. One end of the trunnion shaft 36 is supported in a blind trunnion cap 37 (see Figure 2). The other end of the trunnion shaft 36 passes through a stuffing box 38 of any conventional design. Attached to the external end of the trunnion shaft 36 is a trunnion hub 39 to which is attached a lever arm 40 which adjustably carries a weight 41.

Keyed to that portion of the trunnion shaft 36 which is within the crank housing 16 is a crank arm 42. Mounted for rotation on the end of the crank arm 42 is a push rod 43 extending through central hole 33 of the retaining element 30. This rod 43 rests in a conical recess in the upper end of the socket element 28. The arrangement illustrated thus provides means for exerting a downward force on the valve plug assembly at all times during automatic operation of the dump valve, this force being that exerted by the weight 41 upon the push rod 43. If desired a spring may be employed instead of the weight arrangement shown, springs being the equivalent of weights in this art.

Provision is made for opening the valve manually when desired. This is accomplished by a lifting pin 44 which traverses the lower end of push rod 43. It is so positioned as to engage the lower end of the retaining element 30 when the lever arm 40 is raised manually.

In the automatic operation of the dump valve, it may be assumed that the weight 41 carried by lever arm 40 is adjusted to balance the minimum desired liquid level 2 in vessel 1. In this explanation, it is assumed that there is a substantial differential pressure across the valve caused either by gas pressure in the pipe 1 above the liquid level 2, or by a relatively high vacuum at the outlet 6. A differential pressure across the valve in the direction of flow tends to close the valve. This differential pressure is approximately equal to the product of the area of the main valve element and the unit pressure drop across it. In accordance with the invention it is desired to balance out this force. The balancing diaphragm 20, which has an effective area substantially equal to the area of the valve seat 9, accomplishes the balance as follows:

The downstream pressure in the conduit 8 is in communication with the downstream equalizing chamber 32 as explained above. The downstream pressure is exerting an upward force over the area of valve seat 9. At the same time it is exerting a downward force on the effective area of the balancing diaphragm 20, these two forces cancelling or essentially cancelling each other.

The gas pressure in the gas equalizing chamber 21 is exerting a downward force on the diaphragm 13. The counterpart of this downward force is the gas pressure exerting an upward force on diaphragm 13, but not all of diaphragm 13 is exposed to the gas pressure, the area of valve seat 9 being subtracted. This leaves an unbalance equal to the gas pressure exerting a downward force on the area of valve seat 9. The gas pressure in the gas equalizing chamber 21 is also exerting an upward force on the effective area of the balancing diaphragm 20, cancelling or essentially cancelling out the unbalance in a down direction. Thus it can be seen that the forces within the valve due to differential pressure which would otherwise affect its operation are cancelled out or essentially cancelled out, and the relatively feeble force of the action of the liquid head from liquid level 2 on the diaphragm 13 is free to operate the valve in a satisfactory manner.

The system of forces operative within the dump valve and the net operating forces can be best demonstrated by the application of simple algebra. To pursue the demonstration, let:

$Pg$ represent gas pressure above liquid level 2 in vessel 1.

$h$ represent the pressure caused by liquid head in vessel 1 above the level of diaphragm 13. ($Pg+h$ then represents the total pressure in the lower chamber 14.)

$P_{ds}$ represent the downstream pressure in the outlet 6. (This is also the pressure in the equalizing chamber 32, which is always in communication with outlet 6.)

$A_9$ represent the area of valve seat 9.

$A_8$ represent the area of the bore of cylindrical discharge conduit 8.

$A_{20}$ represent the effective area of balancing diaphragm 20.

$A_{13}$ represent the effective area of diaphragm 13.

$W$ represent the load on the diaphragm assembly by push rod 43.

When the valve is closed:

The total downward forces exerted on the valve plug assembly in the system are:

$$W + A_{20}P_{ds} + A_{13}P_g \quad (1)$$

The total upward forces exerted on the valve plug assembly in the system are:

$$A_9 P_{ds} + (P_g + h)(A_{13} - A_9) + A_{20} P_g \quad (2)$$

$$A_9 = A_{20} \quad (3)$$

(The area of valve seat 9 is equal to the effective area of balancing diaphragm 20 as a basic premise of the valve structure.)

Substituting (3) in (1):

$$W + A_9 P_{ds} + A_{13} P_g \quad (4)$$

Substituting (3) in (2):

$$A_9 P_{ds} + (P_g + h)(A_{13} - A_9) + A_9 P_g \quad (5)$$

Equating (4) and (5) and expanding:

$$W + A_9 P_{ds} + A_{13} P_g = A_9 P_{ds} + A_{13} P_g - A_9 P_g + A_{13} h - A_9 h + A_9 P_g$$

Collecting terms:

$$W = A_{13} h - A_9 h \text{ or } W = h(A_{13} - A_9) \quad (6)$$

Equation 6 demonstrates that when the valve is at the point of opening it is uneffected by pressure, since no pressure terms appear in the equation.

When the valve is partially open (resilient valve disc 10 is away from valve seat 9 but the cylindrical portion of piston 27 is still within the bore of the discharge conduit 8):

The total downward forces are still shown by Equation 4.

The total upward forces exerted on the valve plug assembly in the system are:

$$A_8 P_{ds} + (P_g + h)(A_{13} - A_8) + A_{20} P_g \quad (7)$$

Let $A_9 - A_8 = dA$ or $A_9 - A_8 =$ the difference in areas between valve seat 9 and the bore of the discharge conduit 8.

or:

$$A_8 = A_9 - dA \quad (8)$$

Substituting (3) and (8) in (7):

$$(A_9 - dA)(P_{ds}) + (P_g + h)(A_{13} - \overline{A_9 - dA}) + A_9 P_g \quad (9)$$

Equating (4) and (9) and expanding:

$$W + A_9 P_{ds} + A_{13} P_g = A_9 P_{ds} - dA P_{ds} + A_{13} P_g - A_9 P_g + dA P_g + A_{13} h - A_9 h + dAh + A_9 P_g$$

Collecting terms:

$$W = A_{13} h - A_9 h + dA P_g + dAh - dA P_{ds}$$

Factoring:

$$W = h(A_{13} - A_9) + dA(P_g + h - P_{ds}) \quad (10)$$

The pressure drop across the valve element is $$(P_g + h) - P_{ds} \text{ (see Figure 1).}$$

Let $$(P_g + h) - P_{ds} = dP \quad (11)$$

Substituting (11) in (10):

$$W = h(A_{13} - A_9) + dA\, dP \quad (12)$$

Equation 12 demonstrates that when the valve is partially open it is effected by pressure in a direction to open it still further, the amount of the added opening effort being approximately the product of the differential pressure across the valve element ($dP$) and the difference in areas of $A_9$ and $A_8$ ($dA$).

Thus there are two main opposing forces, $W$ and $h(A_{13} - A_9)$, shown by Equations 6 and 12 in the algebraic development, one up and one down, which enter into the operation of the dump valve. The downward force W is applied to the valve plug assembly through the push rod 43. By applying the force without guides or close fitting parts, the resilient valve disc 10 can always adjust itself to perfect normality with respect to the valve seat 9.

As stated above, the downward force imposed on the push rod 43 could come from a compression spring in the crank housing 16 instead of from the weight 41, but the application or force by a weight is preferred. The spring rate of a spring applies an increasing force as the valve opens and thus introduces a factor which is not desirable.

The upward force, $h(A_{13} - A_9)$, results from the head of liquid in the vessel 1 acting on the area of diaphragm 13 minus the area of the valve seat 9.

As the liquid level 2 rises from a minimum in the vessel 1, the increased liquid head produces an additional upward force on the valve plug assembly. When the upward force on the assembly reaches a value satisfying Equation 6, the load W is carried entirely by the liquid head and no closing effort remains between valve seat 9 and the resilient valve disc 10. Any increase in liquid head beyond this point will initiate the opening of the valve. At the instant of the initial opening, the area of valve seat 9 changes approximately to the area of the discharge conduit 8 due to the proximity of piston 27 and the bore of the conduit 8. This sudden change in area unbalances the valve in a direction to open it still further, the unbalance being in the order of the expression $dAdP$ of equation 12. If the flow is steady and sufficient to keep the valve in a position in which the piston 27 is withdrawn from the conduit 8, the valve will throttle, obeying Equation 12.

If the flow is inadequate to produce the above throttling condition, the valve will obey Equation 12 until the liquid level 2 falls sufficiently to initiate a closing of the valve. At the instant the resilient valve disc 10 touches valve seat 9, the area changes from the area of the conduit 8 to the area of the valve seat 9, the area balance defined by Equation 6 is established, and a force represented by the quantity $dAdP$ is imposed on the diaphragm assembly to close the valve positively. The valve thus opens and closes with snap action.

If the diameter of the outer margin of piston 27 is reduced (decreasing its proximity to the bore of the conduit 8) sufficiently to eliminate, in operation, the transfer of areas between seat 9 and piston 27, the valve obeys Equation 6 and opens no further than is required to accommodate the flow. Under some conditions such a valve operates satisfactorily, but there is then no snap action. One disadvantage is a tendency to wire draw or cut out the main valve element. It should be pointed out, further, that unless a fairly close fitting piston 27 is employed, the valve is inherently unstable even if balanced as described, due to the loss of effects of downstream pressure on the main valve element when the valve is open. There is then susceptibility of the structure to hydraulic ram.

The particular shape of the piston 27 accomplishes, in addition to making the valve operate in a semi-snap action, the elimination of hydraulic ram. During an action, when the outer margin of the piston 27 enters the conduit 8, the speed of closing is arrested because liquid in lower chamber 14 is trapped and must find exit through the annular area between piston 27 and the bore of cylindrical discharge conduit 8 or be forced back out of lower chamber 14 through the inlet 5. Neither of the aforementioned processes can take place rapidly enough to produce a slamming action, and the valve goes through its cycle smoothly.

While only one embodiment has been shown and described, it is obvious that various changes may be made without departing from the spirit of the invention or the scope of the annexed claims.

I claim:
1. In a system for automatically controlling the head of liquid in a vessel containing both liquid and gas under pressure, the vessel having means for supplying liquid thereto and a discharge line for conveying liquid therefrom, the combination with the discharge line of a dump valve structure connected thereto and controlling the flow of liquid therefrom, said dump valve structure consisting essentially of a housing having an inlet conduit and a discharge conduit of the overflow type provided with a rather sharp circular rim constituting a seat for a valve, a valve plug assembly having a disk adapted to rest upon the seat when the valve is closed and having a depending piston integral therewith and adapted to project into the discharge conduit when the valve is closed or partly opened and be completely withdrawn from the discharge conduit when the valve is fully opened, two vertically spaced diaphragms having their outer margins connected to the housing and their inner margins connected to the valve plug assembly to form three chambers in the housing, namely, a lower main flow chamber, an intermediate gas equalizing chamber and an upper downstream equalizing chamber, means for subjecting the main flow chamber to the pressure of the inlet conduit, means for subjecting the gas equalizing chamber to the pressure of the gas space above the liquid level of the vessel to be controlled, and means for subjecting the downstream equalizing chamber to the pressure of the discharge conduit, and physical means such as a weight or the like for exerting a balancing force on the valve plug assembly corresponding to the head of liquid desired to be maintained in the vessel, the arrangement being such that there is no violent movement of the valve plug assembly as its disk moves to leave or come to rest upon said seat.

2. The structure defined in claim 1 in which the diameter of the piston is slightly less than that of the discharge conduit to provide a restricted passage for the flow of fluid past the piston when it is in the discharge conduit, and in which the area of the rim of the valve seat is slightly larger than the area of the discharge conduit to cause a slightly larger area of said disk to be subjected to the difference in pressure between the lower chamber and the discharge conduit just after the valve starts its opening movement than the area of said disk subjected to that difference in pressure when the valve is fully closed.

References Cited in the file of this patent
UNITED STATES PATENTS

| | | |
|---|---|---|
| 602,657 | Franklin | Apr. 19, 1898 |
| 694,033 | Serrell | Feb. 25, 1902 |
| 2,166,742 | Lambert | July 18, 1939 |
| 2,387,792 | Holmes | Oct. 30, 1945 |
| 2,586,410 | Williams | Feb. 19, 1952 |
| 2,603,231 | Birkemeier | July 15, 1952 |
| 2,694,544 | Hall | Nov. 16, 1954 |
| 2,720,891 | Glasgow | Oct. 18, 1955 |

FOREIGN PATENTS

| | | |
|---|---|---|
| 252,243 | Great Britain | May 19, 1926 |